Patented Jan. 9, 1951

2,537,138

UNITED STATES PATENT OFFICE

2,537,138

PHENOLIC COLOR FORMERS

Andrew Bradshaw Jennings, New Brunswick, N. J., assignor to E. I. du Pont de Nemours & Company, Wilmington, Del., a corporation of Delaware No Drawing. Application October 8, 1945, Serial No. 621,163

6 Claims. (Cl. 260—45.1)

This invention relates to the preparation of new organic chemical compounds and more particularly to new color formers. Still more particularly it relates to the preparation of phenolic polymer color formers from phenols and ethers of alkylolamides.

An object of this invention is to provide the art with new and useful chemical compounds from phenols. A more specific object is to provide phenolic polymers which are useful as color formers. A further object is to provide phenolic polymer color formers which are useful in color development processes of color photography. A related object is to provide such color formers from phenols and other economical chemicals. Still other objects will be apparent from the following description of the invention.

The above objects are accomplished by the present invention by reacting a monohydric phenol with an ether of an alkylolamide in a solvent or diluent in the presence of an acidic condensing agent. Thus a monohydric phenol, e. g., alpha-naphthol, may be admixed with a lower dialkyl ether of an alkylolamide in a solvent or diluent medium and an acid, e. g., hydrochloric or sulfuric added with stirring. The reaction starts upon the addition of the acid and proceeds fairly rapidly at room temperature, it being unnecessary to apply external heating. In fact, it is desirable to equip the apparatus with means for cooling the reaction zone.

The products may be recovered by diluting the reaction medium with a solvent miscible therewith, in which the product is insoluble. When water-miscible monohydric alcohols are used as the reaction medium, the products can then be purified by crystallization or extraction with suitable solvents. Low molecular weight condensation products can be removed by extracting them with dilute sodium carbonate solutions.

The purified products are, in general, light in color and amorphous in appearance and usually may be dissolved or dispersed with the aid of caustic alkali solutions, with or without the addition of water-miscible organic solvents. The more highly polymerized products, while still light in color, have somewhat lower solubility and may be dispersed either by solution or with the aid of mechanical grinding or milling.

The polymeric reaction products of the monohydric phenols with the ethers of the alkylolamides have, in the case of the alpha-naphthols, one of the following unit structures:

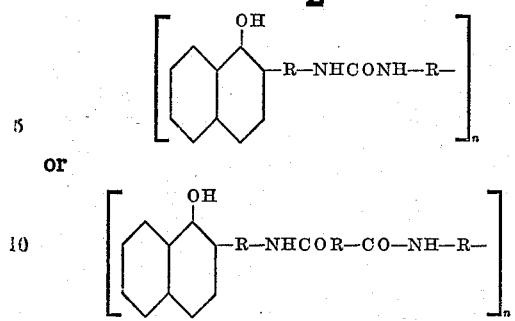

where $n$ is the number of polymeric units and R is methylene or polymethylene.

In order to obtain such products in good yields and in the form of high polymers, it is preferable to use the two reactants in substantially equimolal proportions or an excess of the ether of the dialkylolamide. However, less than one mol, e. g., 0.75 mol, of the monohydric phenol can be used with the attendant formation of bis compounds. They can be removed from the high polymers as described above.

The use of ethers of dialkylolamides leads to products which are color formers. It has been found that the alkylolamides themselves do not usually result in such products but condense in the ortho and para position to alpha-naphthols and result in products which are not color formers.

The novel products can be used in various processes of color photography wherein quinoneimine dyes are formed during the development of reducible silver salt images. They may, for example, be used in hydrophilic colloid layers of photographic elements, e. g., gelatino-silver halide emulsion layers or in gelatin or other water-permeable colloid layers which are in contact with the latter layers, and in alkaline developer solutions containing a primary aromatic amino color coupling agent, etc.

Color-yielding elements can be made by dissolving or dispersing the polymeric reaction products with a solvent, e. g., glycols or their ethers, or by means of a hydrotropic agent and water and then mixing with an aqueous dispersion of a water-permeable or reversible colloid, e. g., gelatin, agar-agar, gum arabic, hardened polyvinyl alcohol, albumin, hydrophilic synthetic resins, cellulose derivative or other binding agent used in layers for photographic elements, and coating on a film base, paper base or other support.

In the preferred aspect of the invention monohydric phenols are reacted with symmetrical dimethoxymethylurea at temperatures from about 0° to 40° C. in the presence of material amounts of hydrochloric acid which is slowly added to the admixture of the two organic reactants in ethanol or aqueous ethanol as the reaction proceeds.

Dimethylolurea is a well-known and commercially available chemical. It polymerizes slowly in the dry state and is therefore usually sold in the form of an aqueous paste containing a little formaldehyde. It may be readily prepared by reacting the components in the proportion of 60 grams of urea and 162 cc. of 37–40% formaldehyde and 8 grams of anhydrous potassium carbonate for one-half hour. A white solid product separates during the heating. After cooling, it is filtered, washed with water, ethanol and diethyl ether and dried in vacuum. The yield is almost quantitative.

The product can be converted into symmetrical dimethoxymethylurea by a procedure somewhat as follows: A mixture of 1000 grams of dimethylolurea, prepared as described in the preceding paragraph, is converted into an aqueous paste containing 70% of dimethylolurea. Three thousand grams of methanol and 1.5 grams of phthalic anhydride are admixed and the admixture stirred and warmed on a steam bath for about two hours. The dimethylolurea goes into solution by interaction with the methanol and the solution is then filtered while hot and then made neutral to phenolphthalin after concentrating to about 1½ liters under vacuum with slight warming. The filtrate is cooled to 0° C. to crystallize the product. The first crop of about 500 grams of crystals melts at about 95–96° C. Additional crops may be obtained by concentrating the filtrate still further. Upon recrystallization from methanol there are obtained pure white needles of symmetrical dimethoxymethylurea melting at 99° C.

Dimethyloloxamide, another suitable intermediate, can be prepared as follows: Oxamide (44 grams) is heated at 90° C. in a solution of 37% aqueous formaldehyde (162 cc.) and potassium carbonate (8 grams) in 800 cc. of water. The oxamide goes into solution by interaction with the formaldehyde in 5 to 10 minutes but heating is continued for about 2 hours. After cooling the product is filtered and dried and dimethyloloxamide having a melting point of 178°–179° C. is obtained in a yield about 50% of theoretical. This compound is then reacted with methanol in the presence of phthalic anhydride in the same manner as described above to produce synthetic dimethoxymethyloloxamide.

Another suitable reactant is dimethoxymethyladipamide. This compound can be prepared by heating a mixture of 288 grams of adipamide, 340 cc. of 30% formaldehyde and 20 grams of potassium carbonate at 100° C. for 1 hour. After cooling, the mixture is diluted slightly with ethyl alcohol and filtered. The product is dried in a vacuum over phosphorus pentoxide in a yield of about 87% and has a melting point of 145° C.

The dried solid (dimethyloladipamide), prepared as just described, is ground and suspended in one liter of methanol at 60° C. About 1/10 mol of dry HCl is passed into the suspension. The solid dissolves and after filtering off the solution one pound of diethyl ether is added on cooling to 0° C. Symmetrical dimethoxymethyladipamide separates out and is filtered and dried. The yield is 311 grams and the product has a melting point of 116° C.

In addition to the alpha-naphthols, there may be used as modifying agents in the reaction mixtures, compounds containing solubilizing groups which condense with dimethylolurea and dimethoxymethylurea to form polymers. A representative compound of this type includes benzaldehyde-o-sulfonic acid alkali metal salts. The use of such agents serves to modify the solubility characteristics of the final polymeric products.

The preparation of color formers from monohydroxy phenols and diethers of alkylolamides is described in the following examples in further illustration of the invention. The parts are by weight.

Example I

A mixture of 7 grams of alpha-naphthol, 5 grams of symmetrical dimethoxymethyladipamide, 2.5 grams benzaldehyde-o-sulfonic acid and 200 cc. of ethanol was agitated and 50 cc. of concentrated sulfuric acid were slowly added over a period of 30 minutes at a temperature of 5 to 10° C. After standing overnight, the product was poured into one liter of cold water and the resulting solid was filtered, washed several times with water, and dried. The resulting product melted with decomposition at 235° C.

The product was incorporated in a gelatino-silver bromide emulsion which was coated onto a film base to form a photographic element. Upon exposure and development with a color coupling developing solution containing para-amino-diethylaniline, there was obtained in situ with the developed silver salts a brilliant, slightly greenish-blue dye image. After removal of the silver and silver salts in Farmer's reducer, there was obtained a brilliant, slightly greenish-blue dye image. The resulting element was free from stain.

Example II

A mixture of 15 grams of alpha-naphthol, 12 grams of symmetrical dimethoxymethylolurea were admixed with 200 cc. of methanol. To the mixture was added 100 cc. of concentrated sulfuric acid slowly and with stirring while maintaining the solution at about 5 to 10° C. A color former having a melting point of 228° C. was recovered by pouring the mixture into 500 cc. of cold water, filtering, and washing the precipitate with water and dilute sodium carbonate solution.

The resulting dyestuff when incorporated in a photographic element and processed after the manner described in the preceding example resulted in a dye image of a brilliant greenish shade.

Example III

To a solution of 7 grams of alpha-naphthol, 7 grams of symmetrical dimethoxymethyl urea in 200 cc. of ethanol, 50 cc. of concentrated hydrochloric acid were added fairly rapidly at room temperature. At the end of the addition, the temperature had risen to 33° C. Solid material separated during the addition. The mixture was then heated to 50° C. for 45 minutes during which more solid separated. After standing overnight, the mixture was poured into water, filtered, and washed with hot water. A pale, buff solid was obtained which had a melting point of over 285° C. It was incorporated in a gelatino-silver bromide emulsion and coated on a film base. After drying, the resulting element was exposed and color developed after the manner disclosed in Example I whereby a powerful blue-green dye image was formed. The compound showed no tendency to be removed from the gelatin layer by alkaline solutions.

When 0.5 gram of benzaldehyde-o-sulfonic acid sodium salt was added to a similar mixture prior to the addition of the hydrochloric acid, a product was obtained which had greater solubility and was more easily dispersed in gelatino-silver halide emulsions. The resulting pure white product obtained likewise gave a powerful blue-green dye which showed no tendency to migrate from the colloid layer.

In place of the particular monohydric phenols described in the above examples, there may be substituted other specific phenols of this class. Additional suitable compounds include o-hydroxy-diphenyl, thymol, 1-naphtol-5-sulfonic acid, m-cresol, 2,4-dichloro-naphthol, xylenol, 1,5 - aminonaphthol, diethyl - m - aminophenol, alpha-hydroxy-quinoline, 2,6-dibromophenol, nitro-naphthol, acetyl-m-aminophenol.

Similarly in place of specific ethers of the alkylolamides described above, there may be substituted similar amounts of other ethers of this type. Suitable compounds include dimethoxymethyloxamide, dimethoxymethyl-adipamide, dimethylolurondimethylether, dimethoxymethylmelamine, trimethoxymethylamine, diethoxymethylmalon-amide, dimethoxymethyl succinamide, dimethoxymethyl sebacamide, dimethoxymethyl glutaramide, and dimethoxymethyl guanidine.

Other modifying agents than the benzaldehyde-o-sulfonic acid sodium salt can be used to improve the solubility and dispersion characteristics of the resulting polymers. Suitable additional compounds include p-hydroxy benzoic acid, salicyclic acid, phthaladelhydic acid, pyruvic acid, levulinic acid, p-hydroxybenzaldehyde, 1-hydroxy-4-naphthaldehyde, glyoxylic acid, m-hydroxybenzaldehyde, benzaldehyde-p-sulfonic acid, p-sulfo-acetophenone, thiophenol, mercaptobenzthiazole.

The present invention has the advantage that it provides a practical process for preparing polymeric reaction products from the alkylolamide ethers. Similar compounds cannot be successfully prepared from the corresponding alkylolamides. The latter compounds when reacted with alpha-naphthol are so reactive that polymeric products are formed which have no color forming properties. The condensation takes place in such a manner that all color-active positions are effectively blocked.

A further advantage of the invention is that it provides a new and useful class of polymeric reaction products to the art. These polymeric compounds are useful as dye intermediates in various dyeing processes. Thus they may be used for the color of plastic materials, in the textile industries, and particularly in processes of color photography utilizing color-coupling development. The desired degree of polymerization and therefore the properties of the finished products are readily controlled by available variations in amount of catalyst, temperature of reaction, and proportion of reactants.

As many widely different embodiments of this invention can be made without departing from the spirit and scope thereof, it is to be understood that the invention is not to be limited except as defined by the claims.

What I claim is:

1. The process which comprises reacting two compounds in substantially equimolecular proportions, namely, a monohydric phenol taken from the group consisting of alpha-naphthol, o-hydroxydiphenyl, thymol, 1 - naphthol - 5-sulphonic acid, m-cresol, 2,4-dichloronaphthol, xylenol, and 2,6-dibromophenol with a compound of the general formula:

ROCH$_2$NH—R$_2$—NHCH$_2$OR$_1$ where R and R$_1$ are taken from the group consisting of methyl and ethyl and R$_2$ is selected from the groups consisting of

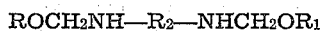

where $n$ is a cardinal number from 1 to 8 at a temperature from 0 to 50° C. in the presence of a water-miscible alkanol and a mineral acid condensation catalyst.

2. The process which comprises reacting two compounds in substantially equimolecular proportions, namely, a monohydric phenol taken from the group consisting of alpha-naphthol, o-hydroxydiphenyl, thymol, 1 - naphthol - 5-sulphonic acid, m-cresol, 2,4-dichloronaphthol, xylenol, and 2,6-dibromophenol with a compound of the general formula:

ROCH$_2$NH—R$_2$—NHCH$_2$OR$_1$ where R and R$_1$ are taken from the group consisting of methyl and ethyl and R$_2$ is selected from the groups consisting of

where $n$ is a cardinal number from 1 to 8 at a temperature from 0 to 50° C. in the presence of a water-miscible alkanol and a strong mineral acid.

3. The process which comprises reacting two compounds in substantially equimolecular proportions, namely, a monohydric phenol taken from the group consisting of alpha-naphthol, o-hydroxydiphenyl, thymol, 1 - naphthol - 5 - sulphonic acid, m-cresol, 2,4-dichloronaphthol, xylenol, and 2,6-dibromophenol with a compound of the general formula:

ROCH$_2$NH—R$_2$—NHCH$_2$OR$_1$ where R and R$_1$ are taken from the group consisting of methyl and ethyl and R$_2$ is selected from the groups consisting of

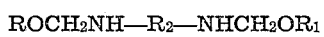

where $n$ is a cardinal number from 1 to 8 at a temperature from 0 to 50° C. in the presence of ethanol and in the presence of sulfuric acid.

4. The process which comprises reacting two compounds in substantially equimolecular proportions, namely, a monohydric phenol taken from the group consisting of alpha-naphthol, o-hydroxydiphenyl, thymol, 1 - naphthol - 5 - sulphonic acid, m-cresol, 2,4-dichloronaphthol, xylenol, and 2,6-dibromophenol with a compound of the general formula:

ROCH$_2$NH—R$_2$—NHCH$_2$OR$_1$ where R and R$_1$ are taken from the group consisting of methyl and ethyl and R$_2$ is selected from the groups consisting of

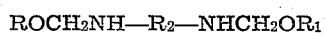

where $n$ is a cardinal number from 1 to 8 at a temperature from 0 to 50° C. in the presence of ethanol and in the presence of hydrochloric acid.

5. A process which comprises admixing alpha-naphthol and symmetrical dimethoxymethylurea in substantially equimolecular proportions with ethanol, slowly adding with stirring concentrated hydrochloric acid while maintaining the temperature below 40° C., adding a large amount of water after condensation has been concluded, and recovering a polymeric reaction product.

6. The process which comprises reacting alpha-naphthol with dimethoxymethylurea in substantially equimolecular proportions in an ethanol solution at a temperature of 5 to 20° C. in the presence of a strong mineral acid and recovering a polymeric reaction product.

ANDREW BRADSHAW JENNINGS.

REFERENCES CITED

The following references are of record in the file of this patent:

UNITED STATES PATENTS

| Number | Name | Date |
|---|---|---|
| 1,699,245 | Luther | Jan. 15, 1929 |
| 2,042,023 | Schonhofer et al. | May 26, 1936 |
| 2,050,557 | Brockmuhl et al. | Aug. 11, 1936 |
| 2,184,303 | Jennings et al. | Dec. 26, 1939 |
| 2,330,291 | Kirby | Sept. 28, 1943 |
| 2,350,138 | Weissberger | May 30, 1944 |
| 2,374,648 | Burke | May 1, 1945 |
| 2,376,679 | Frohlich et al. | May 22, 1945 |
| 2,430,950 | Rothrock | Nov. 18, 1947 |

OTHER REFERENCES

Luck, pp. 306 and 307, Kunststoffe, vol. 29, No. 11, 1939.

Certificate of Correction

Patent No. 2,537,138 January 9, 1951

ANDREW BRADSHAW JENNINGS

It is hereby certified that error appears in the printed specification of the above numbered patent requiring correction as follows:

Column 5, line 25, for "trimethoxymethylamine" read *trimethoxymethylmelamine*; line 35, for "salicyclic" read *salicylic*; same line, for "phthaladelhydic" read *phthalaldehydic*;

and that the said Letters Patent should be read as corrected above, so that the same may conform to the record of the case in the Patent Office.

Signed and sealed this 27th day of March, A. D. 1951.

[SEAL]

THOMAS F. MURPHY,
*Assistant Commissioner of Patents.*